April 25, 1950            W. C. HALL            2,505,288

STATIC IMPEDANCE AND PHASE CHANGING CIRCUIT

Filed Oct. 24, 1946            2 Sheets-Sheet 1

INVENTOR.

Willard C. Hall

April 25, 1950 — W. C. HALL — 2,505,288
STATIC IMPEDANCE AND PHASE CHANGING CIRCUIT
Filed Oct. 24, 1946 — 2 Sheets-Sheet 2

INVENTOR.
Willard C. Hall

Patented Apr. 25, 1950

2,505,288

UNITED STATES PATENT OFFICE 2,505,288

STATIC IMPEDANCE AND PHASE CHANGING CIRCUIT

Willard C. Hall, Los Angeles, Calif.

Application October 24, 1946, Serial No. 707,805

3 Claims. (Cl. 315—276)

The herein described invention is an electrical circuit for improving the power factor of power supplying discharge devices such as fluorescent lamps and the like.

In prior art, the improvement of power factor required the use of condensers in order to reduce the reactive volt amperes, which are inherent in the operation of discharge lamps and is an expensive method for low power transformer supply systems for discharge lamps requiring reactive regulation.

My invention does not employ the use of capacitive reactance to neutralize the inductive reactance, which is required for the effective regulation of current in discharge lamps but employs a new an novel phase shifting circuit arrangement for starting the lamps and also regulating the current with a minimum reactance so that the line input power factor is 90 per cent or better.

It is to be noted that if a reactor were used as a current equalizer, as shown in my Patent #2,302,213, that the lamps would actually be operating in parallel, thus, the load impedance reflected back to the line for two standard 40 watt fluorescent lamps would be approximately 150 ohms. However, in this invention whereby, the reactor transformer becomes in effect a series current limiting impedance and the fact that the lamps are operated in series at an approximate impedance of 520 ohms, as compared to 150 ohms in the former instance, it is readily understood that the reflected impedance of the series circuit arrangement will effectively reduce the primary volt amperes, so that, the resultant power factor approximating that of the lamps themselves may be secured.

One object of my invention is to provide a circuit combination employing a supply transformer and a reactor whereby the discharge lamps are started in parallel and operate in series, so that the transition from the starting cycle to the actual running voltage as supplied to the lamps will cause a phase shift in the reactor windings regulating the current in the discharge lamps and also decreasing the reactive impedance.

Another object of my invention is a unique circuit function which takes place in the reactor circuit during the starting cycle and the running or operating cycle so that the windings of the reactor during the starting cycle are circuit connected as an auto transformer, which supplies a voltage sufficiently high to initiate ionization in one of the lamps and when one of the lamps drops its voltage to the running voltage, the alternate lamp is ionized and started and when both lamps are functioning at their normal running voltage the windings of the series connected reactor are now functioning at a minimum phase relation and thus minimizing the reactive voltage in regulating the current supplying the discharge lamps.

A further object of my invention is to proportion the secondary transformer voltages and phase changing reactor voltages with respect to the lamp drop voltages in such ratios so when the lamps are operating in series they will require approximately one half the usual required volt amperes, thus reducing the supply current by the same equivalent giving an improved volt ampere ratio to the true power required for the operation of the lamps.

A still further object of my invention is to provide a new and novel means of starting the lamps without the use of mechanical and thermostatic switches as employed in the conventional fluorescent lamp circuits, by taking advantage of the subtractive voltage secured by the phase shifting reactor circuit, it is possible to supply a sufficiently high potential to alternate lamps and initiate the starting of the lamps and consequently subtract a considerable portion of this voltage from the lamps when the lamps are operating at their normal voltage drops.

Other objects and advantages of my invention will be apparent from a study of the following specifications, read in connection with the accompanying drawings wherein.

Figure 1:
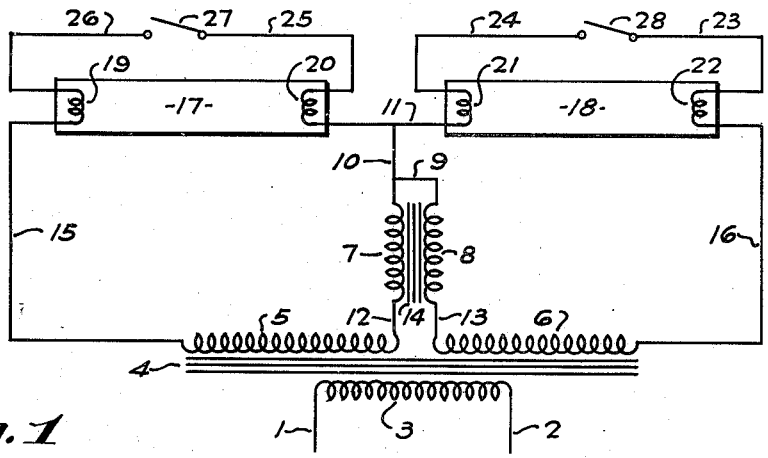
Fig. 1 illustrates a series arrangement of a phase changing reactor auto transformer.

Referring to Fig. 1, showing a circuit for operation of two 40 watt fluorescent lamps, resulting in an improved power factor without capacitive reactance. 1 and 2 are two A. C. supply wires energizing a high impedance primary 3; 4 shows the core which is magnetized at a flux density of approximately fifty thousand lines per square inch, by primary 3 in order that the exciting current may be kept relatively low, as this is an important factor in the reduction of the full load primary current. 5 and 6 show two isolated windings supplying voltages approximately 30 volts greater than the operating voltage of the lamps, this also reduces the reflected lamp volt ampere relation to the input impedance, 14 shows a reactor auto transformer having parallel wound windings 7 and 8 which serves the dual purpose of ballasting the lamps 17 and 18, as well as, supplying the required initiating voltage for alternately starting the lamps, it is seen that reactor 14 is series parallel connected through wires 15, 16, 13, 11, 12, 9 and 10 to the discharge lamps 17 and 18, when switch 27 is closed, causing current to flow through connecting wires 25 and 26 and through cathodes 19 and 20, also through wires 9, 10 and 11, winding 7 of reactor 14 has a voltage impressed upon it, supplied from transformer winding 5, connected by wires 12 and 15 to lamp 17, the current heating the cathodes 19 and 20 will appear in wires 10 and 11 at the same time winding 7 acting as a primary with respect to winding 8 having a one to one ratio and at this instant the voltages developed through auto transformer action cause the E. M. F. in winding 8 to add to that of winding 6, thereby, producing a voltage sufficiently high in conductors 9, 10, 11 and 16 connecting cathodes 21 and 22 of lamp 18, when switch 28 is opened to ionize lamp 18 and drop its voltage so that when switch 27 is opened, the reverse action now takes place, initiating ionization in lamp 17.

After lamps 17 and 18 are operating at normal voltage drops it will be seen that they are actually operating as series connected lamp loads, supplied from series connected supply windings 5 and 6 and the current regulated through the now series connected windings 7 and 8 or reactor 14, connected to supply windings 5 and 6, and wire 9. At this point in the circuit function of my invention, it is to be noted that, there is no current in conductor 10, this is by reason of the fact that lamps 17 and 18 were initially started in series parallel and now since they are operating as series connected loads, the windings 7 and 8 appear in the circuit connecting the two supply windings 5 and 6 as series connected windings, thus the magnetic fluxes in the reactor core 14 are in phase opposition, therefore, it is apparent that a minimum self inductance is introduced in regulating reactor 14.

Figure 2:
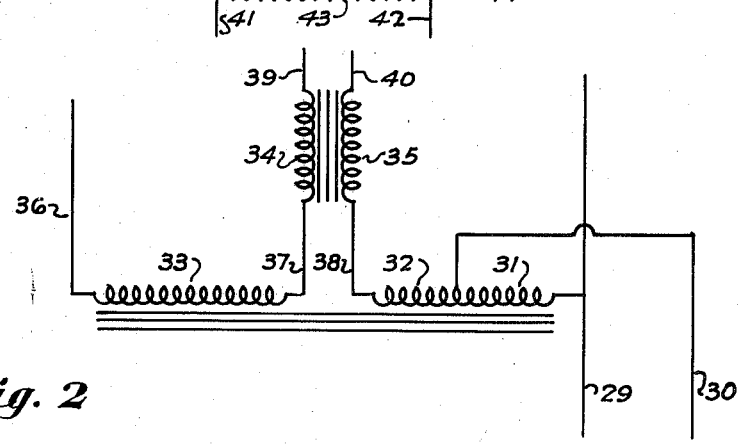
Fig. 2 illustrates an auto transformer circuit supplying the primary input.

Fig. 2 shows an alternate transformer arrangement for supplying power to lamps 17 and 18 and reactor transformer 14 as indicated in Fig. 1, this arrangement comprises an auto transformer, which is more economical to manufacture. 29 and 30 are line wire supply conductors connecting a section of windings 31 and 32 having an isolated winding 33, conductor 29 is common with the line input circuit to lamp 18, conductor 38 connects extended winding 32 to winding 35 of reactor transformer 14 through conductor 40 to the opposite end of lamp 18, isolated winding 33 connects one end of lamp 17 through conductor 36 and the opposite end through conductor 37 and reactor winding 34 through conductor 39. The two windings 34 and 35 of the reactor are connected to the common lead 11 which joins the two lamps. In summary, the difference between the circuits of Figures 1 and 2 lies only in the fact that the former utilizes a separate primary winding 3 and the latter a primary winding 31 which is part of one of the secondary windings 32.

Figure 3:
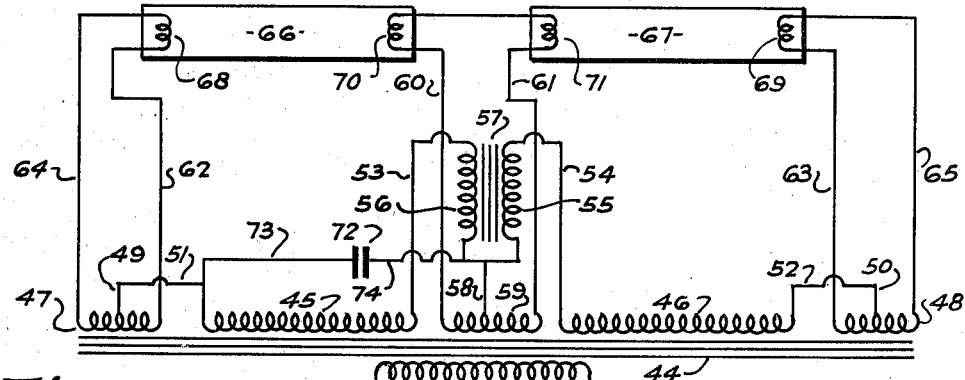
Fig. 3 illustrates a filament heater circuit arrangement with a self starting lamp circuit.

Fig. 3 shows a circuit arrangement similar to Fig. 1, embodying filament heater windings, combined with a switchless lamp starting circuit. 41 and 42 are line wire supply means, connected to primary 43 of transformer 44, having a plurality of windings, namely three filament supply windings 49, 48 and 59, also two isolated lamp voltage supply windings 45 and 46, cathode 68 is connected by conductors 64 and 62 to filament supply winding 47, also cathode 69 of lamp 67 is connected by conductors 63 and 65 to filament winding 48, cathodes 70 and 71 of lamps 66 and 67 are series connected through conductors 60 and 61 to filament supply winding 59. Lamps 66 and 67 are series connected through reactor transformer 57 having windings 55 and 56 connected to mid point 58 of filament heater winding 59.

The discharge lamps 66 and 67 receive their supply voltage from secondary windings 45 and 46 having approximately 135 volts at full load and connected through conductor 51 to mid point 49 of filament heater winding 47, and also through conductor 52 to mid point of filament heater winding 48, the purpose of heating the cathodes 68, 69, 70 and 71 of the lamps 66 and 67 is to decrease the cathodic voltage drop and consequently permit a corresponding decrease in the operating volt amperes required for the operation of the lamps, thereby, decreasing the primary input volt amperes with respect to power and improving the power factor.

Lamps 66 and 67 receive their initial ionization potential without switch means by a new and novel phase shifting circuit, comprising a condenser 72 connected to one end of winding 45 through conductor 73 and to mid tap 58 of filament winding 59 through conductor 74 which is in series with winding 56 of reactor transformer 57, whose opposite end is connected through return wire 53 to winding 45, when winding 45 has a potential of approximately 140 volts, condenser 72 displaces the phase relation of reactor transformer windings 56 and 55 so as to inphase these windings to a degree wherein a potential which is the vector sum of the voltages appearing in windings 46 and 55, which are impressed across lamp 67, the vector sum of these voltages is sufficiently high to initiate ionization in lamp 67.

When lamp 67 drops its voltage to its normal running potential, winding 56 of reactor transformer 57 will have a voltage impressed upon it by action of the voltage now appearing across winding 55, which is additive vectorially to winding 45, the sum of these voltages will now initiate ionization in lamp 66, and as lamp 66 drops its voltage to the running voltage of this lamp, the induced voltages in windings 55 and 56 of the regulating reactor 57 have their maximum phase displacement and no current will flow through conductor 58, thus lamps 66 and 67 are actually operating in series, the current being regulated through the effective impedance drop of winding 55 and 56.

Figure 4:
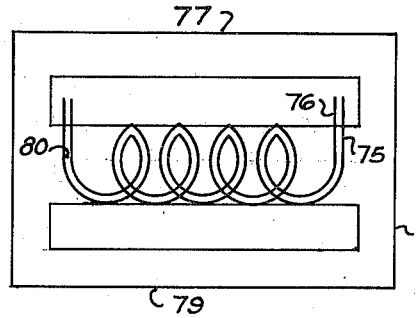
Fig. 4 shows a diagrammatical drawing of the reactor windings.

Fig. 4 shows a diagrammatical drawing of one form of a reactor transformer. 78 shows a shell type iron core having outer limbs 77 and 79. 75 and 76 show two insulated wire conductors, which have a common winding point and are wound parallel with respect to each other, this is done for the purpose of reducing the self inductance of the windings to a minimum. 80 represents the space between the parallel wound conductors, which should be uniform throughout the whole winding of the coil.

Figure 5:
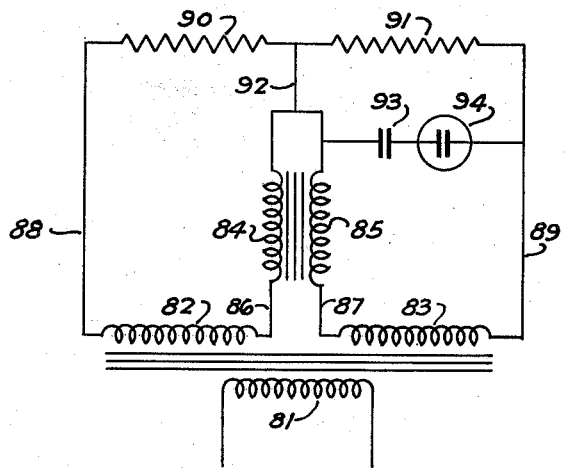
Fig. 5 illustrates a circuit arrangement showing a glow discharge and condenser lamp starting circuit.

Fig. 5 shows an arrangement similar to Fig. 1, but having a novel lamp starting circuit arranged so that no current or voltage appears in the switch circuit after the lamps have been started. 81 shows a high impedance primary winding, 82 and 83 are isolated windings connected by wires 88, 86, 87 and 89 to lamp loads 90 and 91 through a common conductor 92, to reactor transformer windings 84 and 85. It is to be noted, that, common conductor 92 connects condenser 93 and switch means 94, which preferably is a negative glow discharge device having an extinction voltage above the operating voltage of the parallel connected lamp 91, so that, ionization will not take place while lamp 91 is operating at its normal voltage drop, so that therefore, no voltage will appear across the fixed condenser 93 at the time. The purpose of condenser 93 is to raise the voltage appearing across windings 83 and 85 to a sufficiently high potential to readily ionize the discharge switch 94, during the starting cycle of lamp 91 and when lamp 91 drops its voltage, the phase shift occurring in winding 85 of the reactor transformer 14, in Fig. 1, will reduce the condenser current to approximately zero. It is preferable that the ionization switch 94 be of the non-thermo contact type, thus eliminating electrical contact difficulties.

Figure 6:
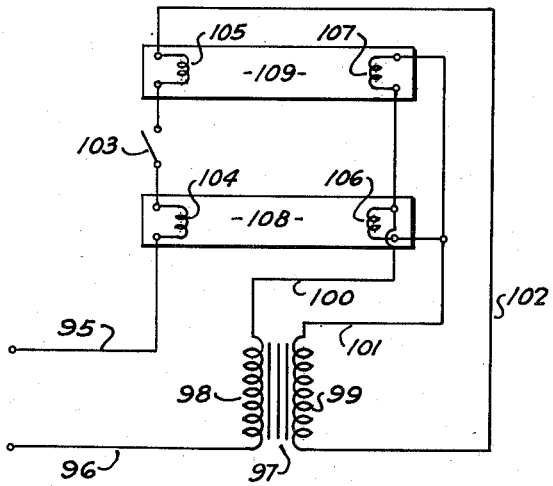
Fig. 6 illustrates a circuit using a phase changing reactor directly connected to the line wire supply.

Fig. 6 shows another form of my invention, wherein, the use of a line transformer may be eliminated for the operation of standard 118 volt line wire supply means connecting one end of reactor transformer 97 to winding 98, and also to one end of cathode 104 of lamp 108, switch means 103, which may be of the thermostatic or gas filled type, connects cathodes 104 and 105 through conductor 102 to the isolation winding 99 of reactor transformer 97, this winding is also connected to one end of cathodes 106 and 107, the opposite end of these cathodes have their return circuit through conductor 100 and winding 98 to line wire 96 of the reactor 97. It is readily seen, that in this low voltage circuit arrangement, that lamps 108 and 109 will operate in series when starter switch 103 is opened, the current in the lamps is effectively ballasted through windings 98 and 99, as well as, the parallel cathodes 106 and 107, which in this particular circuit arrangement will have a normal cathodic voltage drop.

When switch means 103 is closed, the filaments of lamps 108 and 109 are raised to their normal emission, the reactor 97 acts as a current regulating means to limit the starting current through the filaments of the lamps as well as providing an inductive discharge or kick, when switch 103 is opened, thereby, ionizing the gas or vapour in lamps 108 and 109, when the lamp voltage drops to the normal operating voltages, the reactor 97 will have a very low phase displacement with respect to voltage and current supplying the lamp circuit in as much as the inductance of the reactor 97 is of a minimum value due to the phase changing windings 98 and 99. Oscillographic analysis shows that the phase relationship between windings 98 and 99 apparently changes through each half cycle of lamp operation, which indicates a variable impedance cycle which effectively assists in the ballasting of lamp load.

I claim:

1. In a series-parallel circuit for starting and operating electrical discharge lamps; the circuit comprising transformer means having a primary for connection to a source of suitable electrical current and a split secondary having outer coil-end terminals and inner coil-end terminals, an electrical discharge lamp bank having a plurality of lamps wherein each lamp has an electrode at each end thereof, a central tap connecting proximal electrodes of the lamps, an electrical ballast unit having a pair of series connected coils with a central tap and which are out-of-phase with respect to each other substantially 180 electrical degrees, a conductor connecting the two mentioned central taps, the distal ends of the unit having terminals which are series connected to the inner-coil end terminals, respectively, of the secondary of the transformer, and each lamp of the lamp bank having a shunt-switch means across its electrodes which can be closed to heat the lamp and then opened for current discharge between the electrodes of the lamp.

2. In a starting and operating electrical circuit for electrical discharge lamps and the like; the circuit comprising a transformer means having a suitable primary for receiving current from a suitable source, the transformer means having a plurality of secondary coils for supplying current to a plurality of lamps and a ballast unit in series with the said secondary coils, a plurality of lamps of electrical discharge type wherein each lamp is provided with an electrode at each end thereof, conductor means connecting the secondary output of the transformer with one electrode of each lamp, the other electrode of each lamp having a common conductor connected thereto, the ballast unit having two coil means which are wound 180 electrical degrees apart and which have a common connection that is electrically connected to the aforesaid common conductor, and a switch means for each lamp and shunting the electrodes of each lamp so as to cause current to flow in order to heat its respective lamp when the switch thereof is closed, but to cause space discharge in its respective lamp when it is opened.

3. In a circuit means for starting and operating electrical discharge lamps and the like, the circuit consisting of a transformer having a primary for connection with a suitable supply of electrical current and a secondary having a plurality of coils with a ballasting unit in series therewith and connected thereto at a central point thereof, the unit consisting of a plurality of series connected coils wound in opposite phase relationship with a central tap, a pair of discharge lamps with a heating means at each end of each lamp, one heating means of each lamp having an end thereof connected to the said secondary and the other heating means of each lamp having a common electrical connection and also connected to the aforementioned central tap of the ballasting unit, the other terminals of each set of heating means of each lamp having connection with a switch means that is adapted to connect the secondary in series with all the heating means of its respective lamp when the switch is closed, but when opened, to cause discharge of current between the heating means of its respective lamp.

WILLARD C. HALL.

REFERENCES CITED

The following references are of record in the file of this patent:

UNITED STATES PATENTS

| Number | Name | Date |
| --- | --- | --- |
| 2,268,512 | McCarthy | Dec. 30, 1941 |
| 2,302,213 | Hall | Nov. 17, 1942 |
| 2,314,311 | Karash | Mar. 16, 1943 |
| 2,337,992 | Hall et al. | Dec. 28, 1943 |
| 2,358,810 | Karash | Sept. 26, 1944 |
| 2,387,797 | Keiser | Oct. 30, 1945 |
| 2,408,017 | Garretson | Sept. 24, 1946 |
| 2,417,742 | Dosio | Mar. 18, 1947 |
| 2,429,162 | Keiser | Oct. 14, 1947 |
| 2,439,976 | Keiser | Apr. 20, 1948 |